US009454348B2

(12) United States Patent
Sabbouh

(10) Patent No.: US 9,454,348 B2
(45) Date of Patent: Sep. 27, 2016

(54) METHODS, APPARATUSES, AND COMPUTER PROGRAM PRODUCTS FOR FACILITATING A DATA INTERCHANGE PROTOCOL MODELING LANGUAGE

(71) Applicant: HERE Global B.V., Veldhoven (NL)

(72) Inventor: Marwan Badawi Sabbouh, Chelmsford, MA (US)

(73) Assignee: HERE GLOBAL B.V., Veldhoven (NL)

( * ) Notice: Subject to any disclaimer, the term of this patent is extended or adjusted under 35 U.S.C. 154(b) by 10 days.

(21) Appl. No.: 13/924,227

(22) Filed: Jun. 21, 2013

(65) Prior Publication Data

US 2014/0380273 A1    Dec. 25, 2014

(51) Int. Cl.
*G06F 9/44*    (2006.01)
(52) U.S. Cl.
CPC ........................................ *G06F 8/31* (2013.01)
(58) Field of Classification Search
None
See application file for complete search history.

(56) References Cited

U.S. PATENT DOCUMENTS

| | | |
|---|---|---|
| 5,535,375 A | 7/1996 | Eshel et al. |
| 5,742,818 A | 4/1998 | Shoroff et al. |
| 5,911,776 A | 6/1999 | Guck |
| 6,393,442 B1 | 5/2002 | Cromarty et al. |
| 6,529,936 B1 | 3/2003 | Mayo et al. |
| 6,549,918 B1 | 4/2003 | Probert, Jr. et al. |
| 6,721,747 B2 | 4/2004 | Lipkin |
| 7,281,018 B1 | 10/2007 | Begun et al. |
| 7,774,388 B1 | 8/2010 | Runchey |
| 8,433,687 B1 | 4/2013 | Pydi |
| 8,682,925 B1 | 3/2014 | Marquardt et al. |
| 8,838,680 B1 | 9/2014 | Jia |
| 8,880,464 B1 | 11/2014 | Haeske et al. |
| 8,893,077 B1 | 11/2014 | Aiuto et al. |
| 2002/0156866 A1 | 10/2002 | Schneider |
| 2003/0023641 A1 | 1/2003 | Gorman et al. |
| 2003/0070142 A1 | 4/2003 | Drake et al. |
| 2003/0172113 A1 | 9/2003 | Cameron et al. |
| 2005/0188353 A1 | 8/2005 | Hasson et al. |

(Continued)

FOREIGN PATENT DOCUMENTS

WO    WO 2014/202323 A1    12/2014

OTHER PUBLICATIONS

"JSON Validation with JSON Schema", by David Walsh, Nov. 23, 2010.*

(Continued)

*Primary Examiner* — Daxin Wu
(74) *Attorney, Agent, or Firm* — Alston & Bird LLP

(57) ABSTRACT

An apparatus for defining a data interchange protocol (DIP) modeling language may include a processor and memory storing executable computer code causing the apparatus to at least perform operations including defining a DIP modeling language specifying data models shared by communication devices. The data models include data specifying criteria to define DIP objects including instances of data. The computer program code may further cause the apparatus to specify features in the data models corresponding to properties or the objects. The features being utilized in part to determine whether properties or objects of a DIP document(s) are valid. The computer program code may further cause the apparatus to evaluate an object(s) of a DIP document(s) to determine whether the object is valid based on analyzing items of data in the data models specifying that objects assigned a type and name are valid. Corresponding methods and computer program products are also provided.

20 Claims, 38 Drawing Sheets

(56) References Cited

U.S. PATENT DOCUMENTS

| | | |
|---|---|---|
| 2005/0204051 A1 | 9/2005 | Box et al. |
| 2005/0246193 A1 | 11/2005 | Roever et al. |
| 2006/0036993 A1 | 2/2006 | Buehler et al. |
| 2006/0271603 A1 | 11/2006 | Mathias |
| 2007/0130164 A1 | 6/2007 | Kembel et al. |
| 2008/0027981 A1 | 1/2008 | Wahl |
| 2008/0168420 A1* | 7/2008 | Sabbouh .................. 717/104 |
| 2008/0183902 A1 | 7/2008 | Cooper et al. |
| 2009/0132995 A1 | 5/2009 | Iborra et al. |
| 2009/0157725 A1* | 6/2009 | Zheng ................. G06F 17/2725 |
| 2010/0153862 A1 | 6/2010 | Schreiber |
| 2010/0211572 A1 | 8/2010 | Beyer et al. |
| 2011/0153630 A1 | 6/2011 | Vernon et al. |
| 2012/0030187 A1 | 2/2012 | Marano et al. |
| 2012/0041964 A1 | 2/2012 | Kreiner et al. |
| 2012/0084750 A1 | 4/2012 | Hardy et al. |
| 2012/0150989 A1 | 6/2012 | Portnoy et al. |
| 2013/0054519 A1 | 2/2013 | Ohno et al. |
| 2013/0055208 A1 | 2/2013 | Murthy |
| 2013/0073632 A1 | 3/2013 | Fedorov et al. |
| 2013/0080403 A1 | 3/2013 | Yamakawa |
| 2013/0086100 A1* | 4/2013 | de Cerqueira Gatti et al. ........................... 707/769 |
| 2013/0097687 A1 | 4/2013 | Storm |
| 2013/0132386 A1 | 5/2013 | Runchey |
| 2013/0132840 A1 | 5/2013 | Blas, Jr. et al. |
| 2013/0166568 A1 | 6/2013 | Binkert et al. |
| 2013/0179545 A1 | 7/2013 | Bishop |
| 2014/0036317 A1 | 2/2014 | Krig et al. |
| 2014/0067866 A1* | 3/2014 | Chen .................. 707/791 |
| 2014/0122422 A1 | 5/2014 | Tzadikevitch et al. |
| 2014/0207826 A1* | 7/2014 | Gao et al. ..................... 707/803 |
| 2014/0222890 A1 | 8/2014 | Zhu et al. |
| 2014/0282393 A1 | 9/2014 | Coalson |
| 2014/0310243 A1 | 10/2014 | McGee et al. |
| 2014/0324751 A1 | 10/2014 | Roberts et al. |
| 2014/0344781 A1 | 11/2014 | Andres et al. |
| 2014/0379848 A1 | 12/2014 | Sabbouh |

OTHER PUBLICATIONS

"An Introduction to JavaScript Object Notation (JSON) in JavaScript and .NET", by Atif Aziz, Feb. 2007.*
Dictionary.com, definition of "modell", Mar. 12, 2013.*
"Use of Cardinality for JSON array attributes", Tom Rutt, Feb. 16, 2013.*
"Use of Cardinality for JSON array attributes", Tom, Rutt, Feb. 19, 2013.*
"Use of Cardinality for JSON array attributes", Tom Rutt, created on Feb. 19, 2013.*
U.S. Appl. No. 13/924,183, filed Jun. 21, 2013, "Methods, Apparatuses, and Computer Program Products for Facilitating a Data Interchange Protocol", (Marwan Badawi Sabbouh, Inventor) (Here Global B.V., assignee), Unpublished.
Alexander, Keith, "RDF/JSON: A Specification for Serialising RDF in JSON", Proceedings of the 4th Workshop on Scripting for the Semantic Web, Jun. 2, 2008, XP002727873, Tenerife / Spain Retrieved from the Internet: URL:http://ceur-ws.org/Vol-368/paper16.pdf [retrieved on Jul. 29, 2014]; and Anonymous: "SFSW '08: Scripting for the Semantic Web", Internet Article, Retrieved from the Internet: URL:http://ceur-ws.org/Vol-368/ [retrieved on Jul. 29, 2014].
Lanthaler, Markus, et al., "On Using JSON-LD to Create Evolvable RESTful Services", Internet Article, Apr. 2012, pp. 1-8, XP002727868, ISBN: 978-1-4503-1190-8, Retrieved from the Internet: URL:http://ws-rest.org/2012/proc/a4-2-lanthaler.pdf [retrieved on Jul. 29, 2014].
International Searching Authority, International Search Report and Written Opinion for International Application No. PCT/EP2014/060522, Aug. 12, 2014, 9 pages, European Patent Office, The Netherlands.
Decandia, Giuseppe, et al., "Dynamo: Amazon's Highly Available Key-Value Store", Proceedings of the ACM Symposium on Operating Systems Principles, Oct. 14-17, 2007, pp. 205-220, ACM, US.
Lanthaler, Markus, et al., "A Semantic Description Language for RESTful Data Services to Combat Semaphobia", Proceedings of the 5th IEEE International Conference on Digital Ecosystems and Technologies, May 31-Jun. 3, 2011, pp. 47-53, IEEE, Korea.
Bernstein et al., "Context-based prefetch—an optimization for implementing objects on relations", 2000.
Carvalho, "Comparative analysis of authentication schemes on a Java Card smart card", 2011.
Crockford et al., "The application/json Media Type for JavaScript Object Notation (JSON)", RFC 4627, 2006.
Ecma International, "ECMAScript Language Specification", Standard ECMA-262, 2011.
Gill et al., "Impacts of data interchange formats on energy consumption and performance in Smartphones", 2011.
Kobylarz et al., "A Common Interface for Bluetooth-based Health Monitoring Devices", 2013.
Merriam-Webster, "processor", 2014.
Ortega-Corral et al., "A 'Lighter' JSON for Message Exchange in Highly Resource Constrained Wireless Sensor Network Applications", 2012.
Shin, "Introduction to JSON (JavaScript Object Notation)", 2010.
Walsh, "What is JSON Schema?", 2010.
United States Patent and Trademark Office, Office Action for U.S. Appl. No. 13/924,183, Jun. 19, 2015, 27 pages, U.S.A.
"Definition for index", Dictionary.com, Jan. 19, 2013.
Juneau, et al., "The Definitive Guide to Jython Python for the Java Platform", 2010, Apress, 511 pages, USA.
Juneau, et al., "The Definitive Guide to Jython Python for the Java Platform", "Introduction to Pylons", Chapter 15, 2010, Apress, 20 pages, USA.
Sollins, et al., "Functional Requirements for Uniform Resource Names", RFC 1737, Dec. 1994, 7 pages, retrieved from <https://www.ietf.org/rfc/rfc1737.txt> on Dec. 26, 2015, 7 pages.
United States Patent and Trademark Office, Office Action for U.S. Appl. No. 13/924,183, Dec. 31, 2015, 23 pages, USA.
United States Patent and Trademark Office, Notice of Allowance for U.S. Appl. No. 13/924,173, Jun. 20, 2016, 15 pages, U.S.A.

* cited by examiner

```
[                  ┌─ 3
 {                ▼
  "_type": "Entry",
  "_id": "C544C14C-51F0-0001-5FB6-262014061F9F",
  "_name": "Field",
  "_comment": "base class",
  "extends": null
  ....
 },  ┌─ 5
 {...}
]
```

FIG. 1

```
{
"_type": "Field",
"_name": "P",
"isFieldOf": "X"

```
{
"_type": "Field",
"_name": "P",
"isFieldOf": "X",
"aproperty" : "value"

```
[
  {
    "_id": "C544C14C-51F0-0001-5FB6-262014061F9F",
    "_type": "Entry",
    "_name": "Entry",
    "_comment": "base class"
  },
  {
    "_id": "C544C14C-51F0-0001-5FB6-262014061F9F",
    "_type": "Field",
    "_name": "extends",
    "dataType": [
       "string"
    ],
    "_comment": "extended base classes",
    "restriction": "./: Entry",
    "isFieldOf": "Entry",
    "sequence": 1
  }
]
```

FIG. 3

```
[
  {
    "_id": "C5254000-FA80-0001-39AF-BD20F34E142C",
    "_type": "Entry",
    "_name": "Field",
    "_comment": "Field description"
  },
  ...]
```

FIG. 7A

```
{
    "_id": "C5254000-FA80-0001-39AF-BD20F34E142C",
    "_type": "Field",
    "_name": "dataType",
    "dataType": "any",
    "_comment": "dataType description",
    "isFieldOf": "Field",
    "sequence": 1
```

FIG. 7B

```
{
    "_id": "C5254000-FA80-0001-39AF-
BD20F34E142C",
    "_type": "Field",
    "_name": "dataType",
    "dataType": {"_ref": "Entry"},
    "_comment": "dataType description",
    "isFieldOf": "Field",
    "sequence": 1
```

FIG. 7C

```
{
    "_type": " Field",
    "isFieldOf": " Field",
    "dataType": "string",
    "_name": "restriction",
    "maxCardinality": 1,
    "_comment": "track the order of the properties"
},
```

FIG. 7D

```
{
    "_id": "C541E942-A5B0-0001-33DD-9F6D1AFEAD60",
    "_type": "Field",
    "_name": "indexedProperties",
    "dataType": [
       "string"
    ],
    "_comment": "list of index properties",
    "restriction": "./: Field",
    "isFieldOf": "SCBEIndex",
    "minCardinality": 1,
    "maxCardinality": 1, "sequence": 1
},
```

FIG. 7E

```
[{
    "_type": "SCBEIndex",
    "_name": "listindexview1",
    "indexedProperties": [" placesId"],
    "_comment": "Creator's view, to be used
for favorites sorted by distance",
    ...
  },
    {
    "_type": "Field",
    "isFieldOf": "favoritePlace",
    "dataType": "string",
    "sequence": 1,
    "_name": "placesId",
    "_comment": "places"
 }]
```

FIG. 7F

```
[{
    "_type": "SCBEIndex",
    "_name": "listindexview2",
    "indexedProperties": ["ppId"],
    "_comment": "Creator's view, to be used
for favorites sorted by distance",
    ...
  },
  {
  "_type": "Field",
  "isFieldOf": "favoritePlace",
  "dataType": "string",
  "sequence": 1,
  "_name": "placesId",
  "_comment": "places"
}]
```

FIG. 7G

```
{
    "_id": "C5254000-FA80-0001-39AF-
BD20F34E142C",
    "_type": "Field",
    "_name": "minCardinality",
    "dataType": "number",
    "_comment": "use with number only", "isFieldOf": "Field"

```
{
    "_id": "C5254000-FA80-0001-39AF-
BD20F34E142C",
    "_type": "Field",
    "_name": "maxCardinality",
    "dataType": "number",
    "_comment": "use with number only", "isFieldOf": "Field"

```
{
    "_id": "C5254000-FA80-0001-39AF-
BD20F34E142C",
    "_type": "Field",
    "_name": "enum",
    "dataType": "any",
    "_comment": "enum definition", "isFieldOf": "Field"

```
{
    "_id": "C550057E-F440-0001-AA83-1C901D902C60",
    "_type": "Field",
    "_name": "sor",
    "dataType": "string",
    "_comment": "system record",
    "enum": [
        "scbe",
        "analytics"
    ],
    "default": "scbe",
    "minLength": 1,
    "isFieldOf": "systemProperties",
    "sequence": 5
}
```

FIG. 7K

```
{
    "_id": "C5254000-FA80-0001-39AF-BD20F34E142C",
    "_type": "Field",
    "_name": "default",
    "dataType": "any",
    "_comment": "default values",
    "isFieldOf": "Field"
},
```

FIG. 7L

```
{
    "_id": "C5254000-FA80-0001-39AF-
BD20F34E142C",
    "_type": "Field",
    "_name": "isFieldOf",
    "dataType": "string",
    "_comment": "isFieldOf description",
    "restriction": "./:Entry",
    "maxCardinality":1,
    "isFieldOf": "Field",

```
{
    "_id": "C5254000-FA80-0001-39AF-BD20F34E142C",
    "_type": "Field",
    "_name": " propertyIntersectWith ",
    "dataType": ["string"],
    "restriction": "./: Field",
    "_comment": "other properties that must be used in conjunction with me",
    "isFieldOf": "Field"
},
```

FIG. 7N

```
{
    "_id": "C5254000-FA80-0001-39AF-BD20F34E142C",
    "_type": "Field",
    "_name": "propertyDisjointWith ",
    "dataType": ["string"],
    "restriction": "./: Field",
    "_comment": "other properties that must not be used in conjunction with me",
    "isFieldOf": "Field"
},
```

FIG. 70

```
{
  "_id": "C5254000-FA80-0001-39AF-BD20F34E142C",
  "_type": "Field",
  "_name": "minimum",
  "dataType": "number",
  "_comment": "use with numbers",
  "propertyIntersectWith": ["./:Field; dataType= number"],
  "isFieldOf": "Field"
},
```

FIG. 7P

```
{
    "_id": "C5254000-FA80-0001-39AF-BD20F34E142C",
    "_type": "Field",
    "_name": "maximum",
    "dataType": "number",
    "_comment": "use with numbers",
    "propertyIntersectWith": ["./:Field; dataType= number"],
    "isFieldOf": "Field"
},
```

FIG. 7Q

```
{
    "_id": "C5254000-FA80-0001-39AF-BD20F34E142C",
    "_type": "Field",
    "_name": " minLength ",
    "dataType": "number",
    "_comment": "use with numbers",
    "propertyIntersectWith": ["./:Field; dataType= string"],
    "isFieldOf": "Field"
},
```

FIG. 7R

```
{
    "_id": "C5254000-FA80-0001-39AF-
BD20F34E142C",
    "_type": "Field",
    "_name": " maxLength ",
    "dataType": "number",
    "_comment": "use with numbers",
    "propertyIntersectWith": ["./:Field;
dataType= string"],
    "isFieldOf": "Field"

```
{
    "_id": "C5254000-FA80-0001-39AF-BD20F34E142C",
    "_type": "Field",
    "_name": " minItems ",
    "dataType": "number",
    "_comment": "use with numbers",
    "propertyIntersectWith": ["./:Field;dataType=%5Bany%5D],
    "isFieldOf": "Field"
},
```

FIG. 7T

```
{
    "_id": "C5254000-FA80-0001-39AF-BD20F34E142C",
    "_type": "Field",
    "_name": "maxItems",
    "dataType": "number",
    "_comment": "use with numbers",
    "propertyIntersectWith": ["./:Field; dataType= string"],
    "isFieldOf": "Field"
},
```

FIG. 7U

```
{
    "_id": "C5254000-FA80-0001-39AF-
BD20F34E142C",
    "_type": "Field",
    "_name": "sequence ",
    "dataType": "number",
    "_comment": "monotonic number", "isFieldOf": "Field"

```
[
  {
    "_type": "Entry",
    "_id": "C561B412-81D0-0001-67E8-1C9018201B0E",
    "_name": "Object",
    "_comment": "the object depicting the collection"
  },
]
```

FIG. 8

```
{
    "_type": "Field",
    "isFieldOf": "Object",
    "dataType": "number", "sequence": 1,
    "_name": "minCardinality",
    "default": 0,
    "_comment": "cardinality constraint"
}
```

FIG. 9A

```
{
    "_type": "Field",
    "isFieldOf": "Object",
    "dataType": "number", "sequence": 2,
    "_name": "maxCardinality", "_comment": "cardinality constraint"
}
```

FIG. 9B

```
{
"_type": "Field",
"_isFieldOf": "Object",
"dataType": ["string"],
"sequence": 3,
"_name": "disjointWith",
"restriction": "./Entry",
"_comment":
}
```

FIG. 9C

```
{
"_type": "Field",
"isFieldOf": "Object",
"dataType": [" string "],
"sequence": 4,
"_name": "intersectWith",
"restriction": "./: Entry",
"_comment": "intersection constraint"
}
```

FIG. 9D

```
{
    "_type": "Object",
    "_name": "SCBEIndex"
    "minCardinality": 1,
    "intersectWith": ["scbeAccessControl"]

```
[
  {
    "_type": "Entry",
    "_id": "C5673CB3-1510-0001-1FBB-11BB1ABC1D29",
    "extends": [
      " scbeAccessControl",
      " systemProperties",
      "DiscoveryMetadata",
      " scbeAttachment"
    ],
    "_name": "SCBEModelTest2",
    "_comment": "canonical model for SCBE data model"
  },
```

FIG. 10

… # METHODS, APPARATUSES, AND COMPUTER PROGRAM PRODUCTS FOR FACILITATING A DATA INTERCHANGE PROTOCOL MODELING LANGUAGE

TECHNOLOGICAL FIELD

An example embodiment of the invention relates generally to cloud system management and more particularly, relates to a method, apparatus, and computer program product for defining a data interchange protocol modeling language for usage via a cloud system.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to cloud systems which store and share data for consumers of the cloud system.

At present, existing data modeling languages fail to meet the requirements for cloud systems. This is evident from the notion that current cloud systems endure the burden of defining their own data modeling language. Existing data modeling languages typically specify the structure of data by grouping the attributes or properties as types, and by specifying relationships between types. At present, cloud system data models not only contain the listing of properties and their constraints, but also contain object-metadata specifying processing directives to the cloud system, property annotations, index definitions and access control policies.

In addition to the above requirements, there are also some nonfunctional requirements that the data modeling language supports. For example, latency requirements, and the requirement that the data model is processed by the same components of the cloud system that processes instance data. Hence, the need for the data modeling language to share a common object model with the rest of the instance data.

There are several data modeling languages currently in existence such as JavaScript Object Notation (JSON) Schema, Resource Description Framework/Web Ontology Language (RDF/OWL), Extensible Markup Language (XML) Schema, among others. JSON Schema is a data modeling language for JSON. JSON Schema permits the definition of properties that constitute a type. However, there are several issues related to the use of JSON Schema. First of all, JSON Schema does not support property annotations. Secondly, there are no object models defined for JSON Schema. Furthermore, the combination of using JSON Schema and JSON relies on jpath for accessing JSON objects/JSON properties, further complicating the use of these technologies. The combination of JSON and JSON Schema is not expressive enough to validate the data models of cloud systems.

While RDF/OWL is a powerful data modeling language designed for use on the web there are issues with using RDF/owl such as the lack of JSON serialization for RDF/OWL, and the open world assumptions of RDF/OWL. These issues present significant hurdles in the adoption of RDF/OWL in cloud-based systems that require validation of data.

Although XML Schema is a data modeling language, XML Schema is inappropriate for JSON serialization since it relates to XML and not JSON.

In view of the foregoing drawbacks, there is a need for a data modeling language to share a common object model with the data of a cloud system.

BRIEF SUMMARY

A method, apparatus and computer program product are therefore provided for defining a data interchange protocol (DIP) modeling language that facilitates sharing of a common object model including data of a cloud system.

In an example embodiment a data interchange protocol (DIP) may define an object type system using JSON. DIP uses attributes such as, for example, type and name, for data of a cloud system, making each DIP object "typed" and "named". In this regard, DIP may provide standard DIP object types for the creation of objects, for associating properties with an object(s). In addition, an example embodiment may enable DIP to define uniform resource identifier (URI) conventions for addressing DIP objects and properties.

An example embodiment may also refine the DIP standard types and define an inheritance model for DIP allowing Is-A relationships between types. Additionally, an example embodiment may define or create data modeling features such as, for example, property disjointness, property restrictions, property intersections (e.g., implications), property cardinality constraints, object disjointness, object intersection, object cardinality and any other suitable data modeling features, thereby making the DIP modeling language very expressive.

As such, an example embodiment may utilize the defined DIP modeling language to not only validate instances of data, but to also validate schemas themselves.

In one example embodiment, a method for defining a data interchange protocol modeling language is provided. The method may include defining a data interchange protocol modeling language specifying data models shared by one or more communication devices. The data models may include data specifying criteria to define one or more data interchange protocol objects including instances of data. The method may further include specifying features in the data models corresponding to properties of the objects or the objects. The specified features being utilized in part to determine whether one or more properties or objects of at least one data interchange protocol document are valid. The method may further include evaluating at least one object of a data interchange protocol document to determine whether the object is valid based in part on analyzing defined items of data in the data models specifying that objects assigned a type and a name are valid objects.

In another example embodiment, an apparatus for defining a data interchange protocol modeling language is provided. The apparatus may include a processor and a memory including computer program code. The memory and computer program code are configured to, with the processor, cause the apparatus to at least perform operations including defining a data interchange protocol modeling language specifying data models shared by one or more communication devices. The data models may include data specifying criteria to define one or more data interchange protocol objects including instances of data. The memory and computer program code are also configured to, with the processor, cause the apparatus to specify features in the data models corresponding to properties of the objects or the objects. The specified features being utilized in part to determine whether one or more properties or objects of at least one data interchange protocol document are valid. The memory and computer program code are also configured to, with the processor, cause the apparatus to evaluate at least one object of a data interchange protocol document to determine whether the object is valid based in part on analyzing defined items of data in the data models specifying that objects assigned a type and a name are valid objects.

In yet another example embodiment, a computer program product for defining a data interchange protocol modeling language is provided. The computer program product includes at least one computer-readable storage medium having computer-executable program code instructions stored therein. The computer-executable program code instructions may include program code instructions configured to define a data interchange protocol modeling language specifying data models shared by one or more communication devices. The data models may include data specifying criteria to define one or more data interchange protocol objects including instances of data. The computer program product may further include program code instructions configured to specify features in the data models corresponding to properties of the objects or the objects. The specified features being utilized in part to determine whether one or more properties or objects of at least one data interchange protocol document are valid. The computer program product may further include program code instructions configured to evaluate at least one object of a data interchange protocol document to determine whether the object is valid based in part on analyzing defined items of data in the data models specifying that objects assigned a type and a name are valid objects.

BRIEF DESCRIPTION OF THE SEVERAL VIEWS OF THE DRAWINGS

Figure 4:
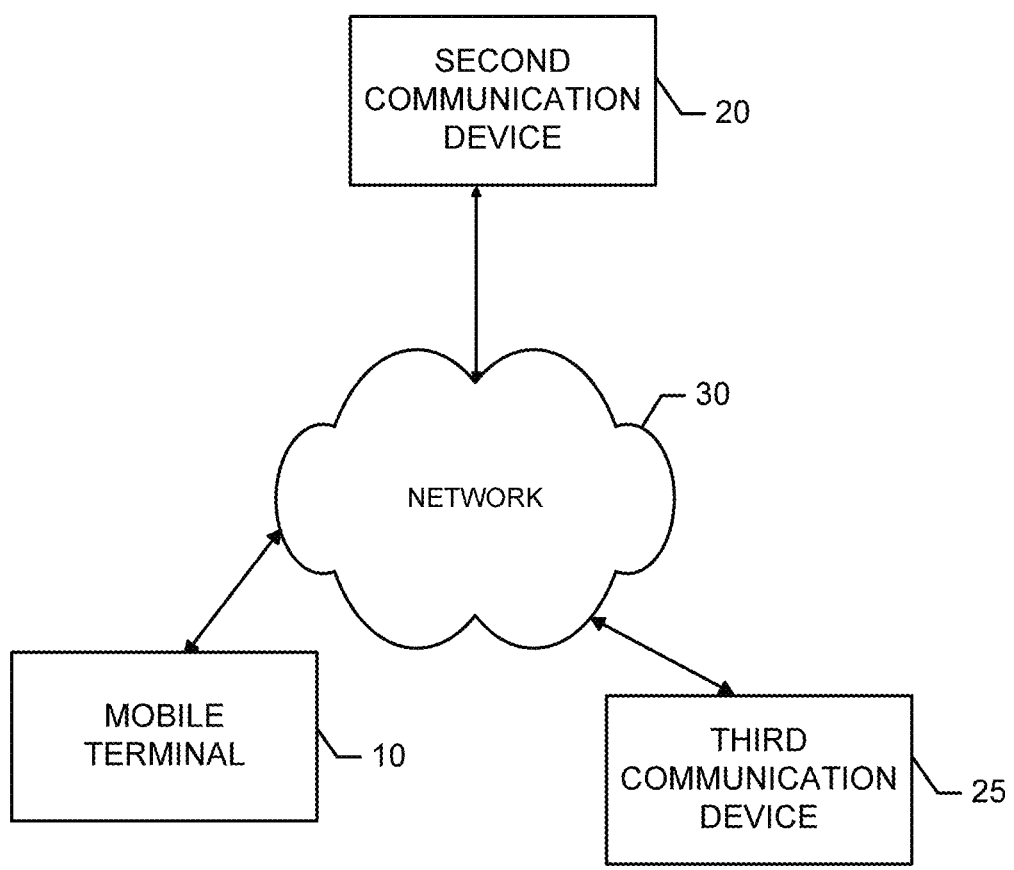
Figure 5:
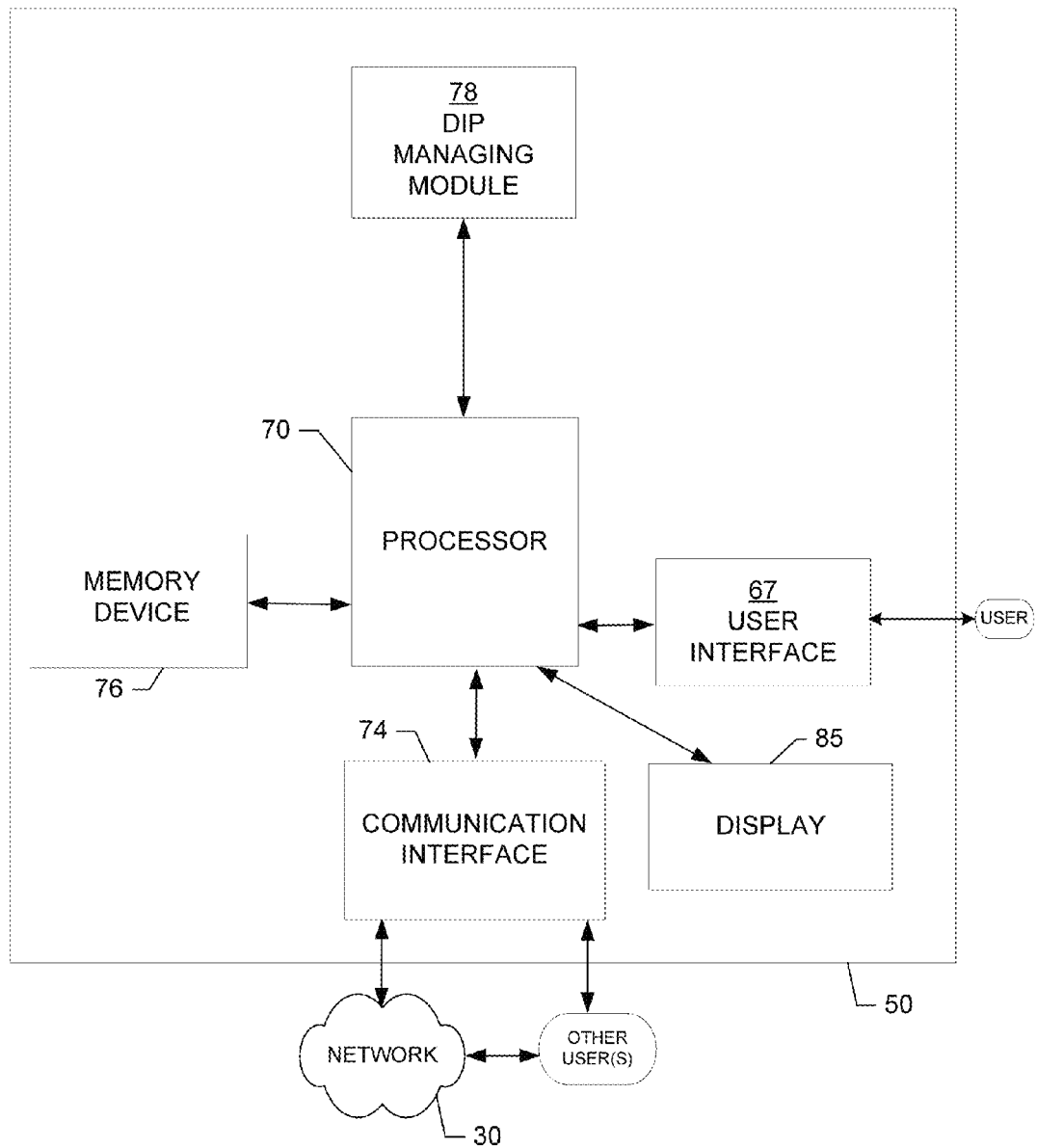
Figure 6:
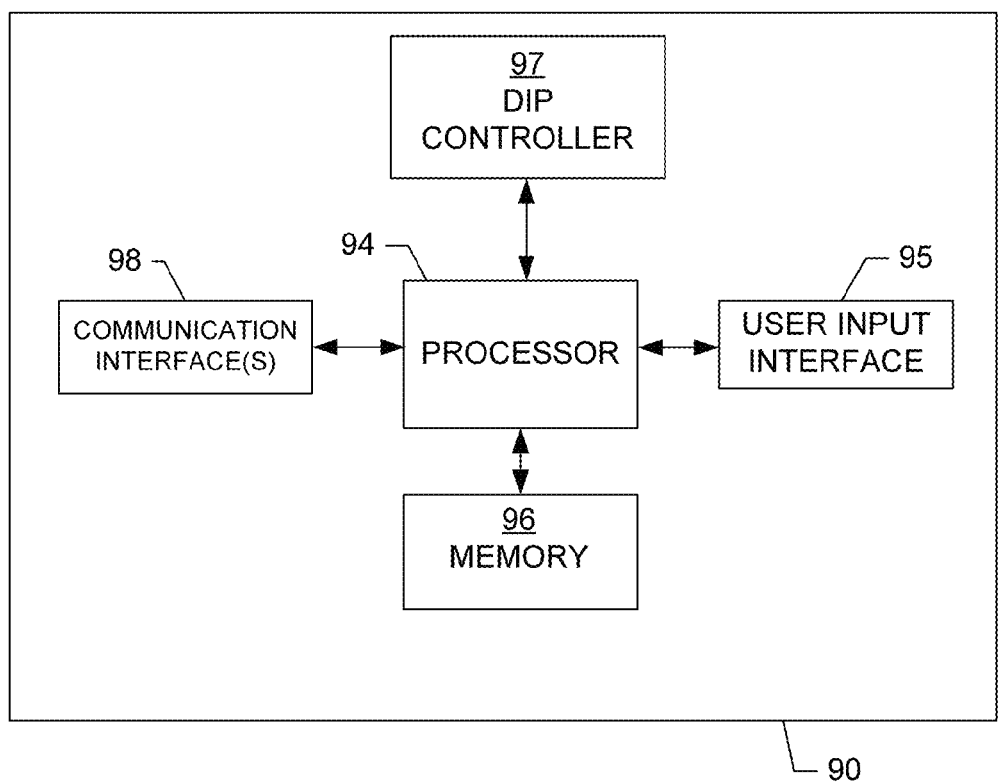
Figure 11:
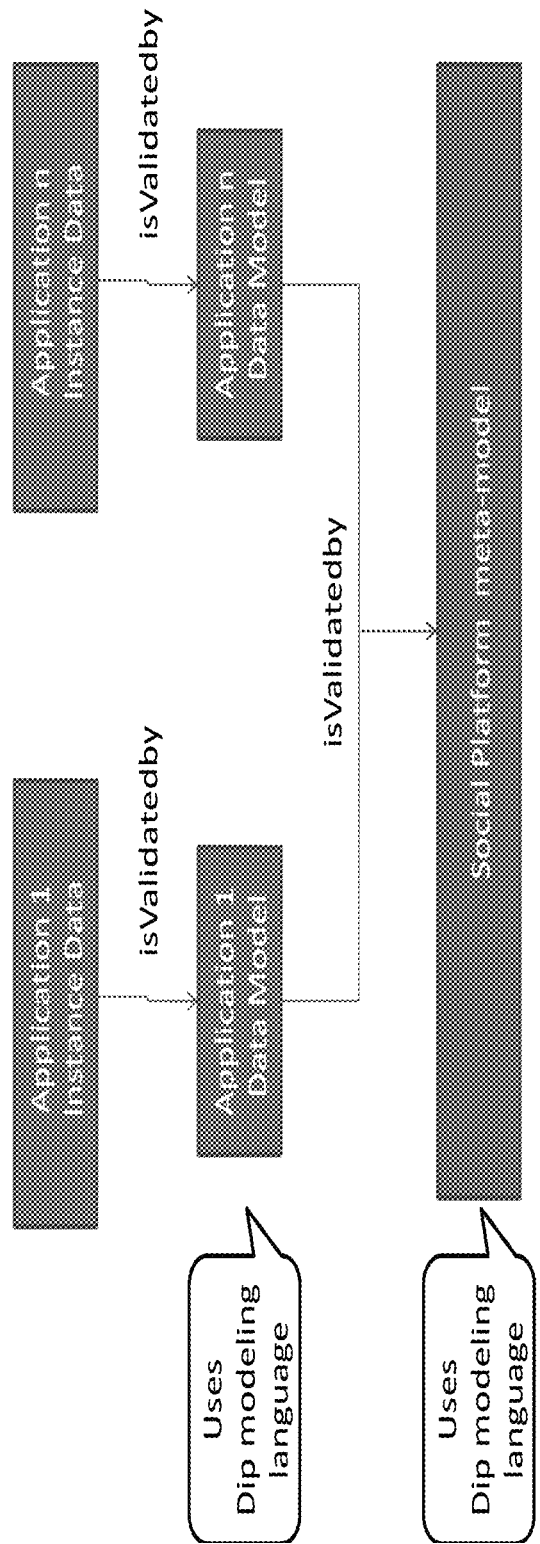
Figure 12:
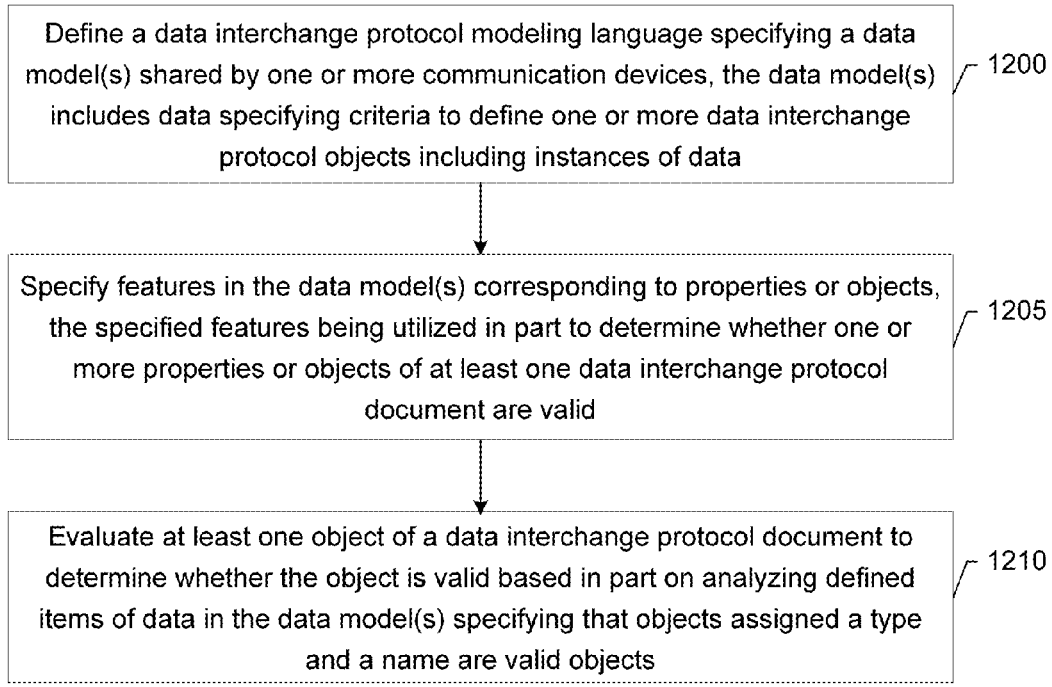

Having thus described the invention in general terms, reference will now be made to the accompanying drawings, which are not necessarily drawn to scale, and wherein:

FIG. 1 is a diagram illustrating a DIP document according to an example embodiment of the invention;

FIG. 2A is a diagram illustrating a definition of property P of Type X according to an example embodiment of the invention;

FIG. 2B is a diagram illustrating a definition of property P of Type X and {"aproperty": "value"} according to an example embodiment of the invention;

FIG. 3 is a diagram illustrating an Entry DIP document according to an example embodiment of the invention;

FIG. 4 is a schematic block diagram of a system that may include an example embodiment of the invention;

FIG. 5 is a schematic block diagram of an apparatus according to an example embodiment of the invention;

FIG. 6 is a schematic block diagram of a network device according to an example embodiment of the invention;

FIGS. 7A-7V are diagrams illustrating property definitions of type Field according to an example embodiment of the invention;

FIG. 8 is a diagram illustrating a DIP object definition according to an example embodiment;

FIG. 9A is a diagram illustrating a minimum cardinality DIP object definition according to an example embodiment of the invention;

FIG. 9B is a diagram illustrating a maximum cardinality DIP object definition according to an example embodiment of the invention;

FIG. 9C is a diagram illustrating a disjointWith object definition according to an example embodiment of the invention;

FIG. 9D is a diagram illustrating an intersectWith object definition according to an example embodiment of the invention;

FIG. 9E is a diagram illustrating an example of usage of a type Object according to an example embodiment of the invention;

FIG. 10 is a diagram illustrating an example of usage of an extends definition according to an example embodiment of the invention;

FIG. 11 is a diagram illustrating usage of a DIP modeling language, in part, to validate one or more applications and data models according to an example embodiment of the invention;

FIG. 12 illustrates a flowchart for defining a DIP modeling language according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a schema(s) may denote a set of constraints imposed on a particular object (e.g., a DIP object). The constraints may define, among other things, the properties associated with the object, the relationships that the object has with other objects (e.g., DIP objects), and the types for the values of the properties.

Additionally, as referred to herein, serialization may denote the writing of data using a particular syntax, so that the data may be interpreted correctly by a device or machine.

Also, as referred to herein, a cloud system(s) may, but need not, denote a system that utilizes computer resources that are available across networks (e.g., wide area networks) using Create Read Update Delete (CRUD) and search APIs.

An example embodiment may facilitate provision of a data interchange protocol that uses a single structure to exchange data between a cloud system and communication devices of the cloud system. The single structure may be referred to herein as a DIP document. In an example embodiment, the data to be exchanged in the cloud system utilizes the DIP document. The DIP document includes JSON items such as, for example, JSON items in a JSON list in which each item/member of the list is a JSON object. FIG. 1 shows a data interchange protocol document including data (e.g., a JSON list) specifying two DIP objects 3 and 5. The first object 3 may be denoted by data within the first set of curly brackets (e.g., { }) and may specify instances of data designating a type (e.g., "_type": "Entry"), an identifier (e.g., "_id":"C544C14C-51F0-0001-5FB6-262014061F9F"), name, (e.g., "_name":"Field"), a comment (e.g., "_comment":"base class") and property such as extends (e.g., "extends":null). The "_id" is the key to the corresponding DIP document in a key/value store of a network device (e.g., network device 90 of FIG. 6) of a cloud system. The second DIP object 5 in the DIP document of FIG. 1 is denoted by the ellipses in the second set of curly brackets (e.g., { . . . }) indicating that one or more instances of data are included in the second DIP object 5. For more information regarding the data interchange protocol and DIP documents including DIP objects, see U.S. patent application Ser. No. 13/924,183, entitled: Methods, Apparatuses and Computer Program Products for Facilitating a Data Interchange Protocol, which is filed concurrently herewith. The content of the foregoing patent application is hereby incorporated by reference in its entirety.

As referred to herein, DIP objects may be JSON objects. In this regard, DIP objects may include property name/value pairs as specified in the JSON specification. A DIP object model reserves the use of all property names beginning with _.

Additionally, as used herein, property names beginning with _ may be referred to as system properties. System properties may have special meanings, and the system properties may occur in any object(s) (also referred to herein as DIP object). In one example embodiment, the system properties may be integral to a system (e.g., a cloud system) and they may be undefined in any data model. Furthermore, the property "_name", and "_type" may be mandatory for each DIP object(s).

As referred to herein, the terms an instance, instance(s) of data, typed instance(s) and similar terms may be used interchangeably to denote a DIP object(s) with a _type property set to a type defined in a system (e.g., cloud system).

As referred to herein, a DIP validator (also referred to herein as DIP controller) may be a parser (e.g., a JSON parser) that also enforces DIP rules. For example, a DIP validator may generate an exception or error in an instance in which the DIP validator encounters a DIP object(s) without a _type set to a valid type in a system (e.g., a cloud system).

Additionally, as referred to herein, defining or creating property P of type X may denote creating an instance of type Field, with _name=P, and _type=Field, and isFieldOf=X. An example of a definition of property P of Type X is shown in FIG. 2A.

Also, as referred to herein, defining or creating type X may denote creating an instance of type Entry, with _name=X. In addition, defining or creating an instance of type X may denote creating a DIP object with _type=X. Moreover, defining or creating property P of type X, and {"aproperty": "value"} denotes creating an instance of type Field, with _name=P, _type=Field, isFieldOf=X, and aproperty=value. An example embodiment of a definition of property P of Type X and {"aproperty": "value"} is shown in FIG. 2B.

In the data interchange protocol of an example embodiment, the base type, from which all other new types may be generated, is Entry. In this regard, an Entry type definition may be utilized to define all other types of a system (e.g., a cloud system). Additionally, in the data interchange protocol of an example embodiment, a Field type definition may be utilized to define properties and associate the properties with a type(s). The other types in a system (e.g., a cloud system) may be derived or created from the Entry type and the Field type.

FIG. 3 shows the definition of Entry type in a data interchange protocol document (also referred to herein as Entry document). The first instance in the DIP document of FIG. 3 specifies Entry to be a type. In an example embodiment, a device (e.g., a network device) of a system (e.g., a cloud system) may define Entry using the Entry type definition itself. The second instance in the DIP document of FIG. 3 is an instance of type Field. This instance uses the System Properties, indicating that the instance name is extends. In addition to the system properties, the DIP document of FIG. 3 includes other properties such as, for example, dataType, isFieldOf, and sequence. In summary, the Entry document of FIG. 3 illustrates that Entry is a type and that Entry has a property called extends. The value of extends is a list of string. As shown in FIG. 3, the sequence number of extends is 1. Furthermore, extends is a Field of Entry. The DIP of an example embodiment adopts the convention of grouping all properties belonging to type in one DIP document. Furthermore, by convention, DIP may stipulate that only one type may be defined in a DIP document, and that the value of _id in the first Entry of the DIP document is the key of the DIP document in a key/value store (e.g., a key/value store of a network device).

As described above, in an example embodiment, the definition of Entry may require the use of two types such as, for example, the Entry type definition and the Field type definition. As such, the definition of any new type(s) may require the use of Entry and Field in an instance in which properties are associated with the type(s) being defined. For more information regarding the DIP Entry type definition and the DIP Field type definition, see U.S. patent application Ser. No. 13/924,183, entitled: Methods, Apparatuses and Computer Program Products for Facilitating a Data Interchange Protocol, which is filed concurrently herewith. The content of the foregoing patent application is hereby incorporated by reference in its entirety.

In order for the Entry document to specify an instance of Field, the Field is defined, by a device (e.g., a network device (e.g., network device 90 of FIG. 6)) as a type in another document. The definition of Field is described more fully below.

FIG. 4 illustrates a generic system diagram in which a device such as a mobile terminal 10 is shown in an example communication environment. As shown in FIG. 4, an embodiment of a system (e.g., a cloud system) in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 4 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 4 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 4, the mobile terminal 10 and the second and third communication devices 20 and 25 may communicate in accordance with, for example, Radio Frequency (RF), Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 5) capable of employing an embodiment of the invention.

FIG. 5 illustrates a schematic block diagram of an apparatus according to an example embodiment. An example embodiment of the invention will now be described with reference to FIG. 5, in which certain elements of an apparatus 50 are displayed. The apparatus 50 of FIG. 5 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 5, the apparatus 50 may include or otherwise be in communication with a processor 70, a user interface 67, a communication interface 74, a memory device 76, a display 85, and a data interchange protocol (DIP) managing module 78. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. The memory device 76 may store one or more applications including one or more computer instructions, software code, software instructions or the like. The memory device 76 may also store data received (e.g., a DIP document(s), one or more instances of data of a DIP document(s)) from one or more network devices (e.g., of a cloud system).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control the DIP managing module. The DIP managing module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the DIP managing module 78, as described herein. Thus, in an example in which software is employed, a device or circuitry (e.g., the processor 70 in one example) executing the software forms the structure associated with such means.

The DIP managing module 78 may define a single structure such as, for example, a DIP document to exchange data between a network device of a cloud system (also referred to herein as cloud) and other communication devices (e.g., other apparatuses 50) of the cloud system, as described more fully below.

In this regard, the data to be exchanged between the communication devices and a network device (e.g., the network device 90 of FIG. 6) of the cloud system may include a DIP document. The DIP document, generated by the DIP managing module 78, may include one or more instances of data such as, for example, JSON data (e.g., a JSON list) with each item of the data being a JSON object. In this regard, the DIP module 78 may serialize and transmit structured data such as a DIP document(s) over a network (e.g., network 30) to a network device (e.g., network device 90 of FIG. 6) of a cloud system. In some embodiments, the DIP managing module 78 may transmit a DIP document(s) between a web application(s), via a Web browser, of the apparatus 50 and a network device of a cloud system.

Referring now to FIG. 6, a block diagram of an example embodiment of a network device is provided. In an example embodiment, the network device 90 (e.g., a server (e.g., communication device 20)) may be a network device of a cloud system. As shown in FIG. 6, the network device (e.g., a server (e.g., a Not Only Structured Query Language (NoSQL) server)) generally includes a processor 94 and an associated memory 96. The memory 96 may include volatile and/or non-volatile memory, and may store content, data and/or the like. For example, the memory 96 may store content, data, information (e.g., one or more DIP documents, one or more data models, etc.), and/or the like transmitted from, and/or received by, the network device. Also for example, the memory 96 may store client applications, instructions, and/or the like for the processor 94 to perform the various operations of the network device in accordance with an embodiment of the invention, as described herein.

The memory 96 may be an electronic storage device (for example, a computer readable storage medium) comprising gates configured to store data (for example, bits) that may be retrievable by a machine (for example, like processor 94). In some example embodiments, the memory 96 may be configured to store information, data, content, files, applications, instructions (e.g., computer instructions) or the like for enabling the network device 90 to carry out various functions in accordance with example embodiments of the invention. For instance, the memory 96 may store content, data, information, and/or the like transmitted from, and/or received by, the network device 90.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The processor 94 may be embodied in a number of different ways. For example, the processor 94 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 94 may be configured to execute instructions stored in the memory 96 or otherwise accessible to the processor 94. As such, whether configured by hardware or software methods, or by a combination thereof, the processor 94 may represent an entity (e.g., physically embodied in circuitry) capable of performing operations according to an embodiment of the invention while configured accordingly. Thus, for example, when the processor 94 is embodied as an ASIC, FPGA or the like, the processor 94 may be specifically configured hardware for conducting the operations described herein. Alternatively, as another example, when the processor 94 is embodied as an executor of software instructions, the instructions may specifically configure the processor 94 to perform the algorithms and operations described herein when the instructions are executed. However, in some cases, the processor 94 may be a processor of a specific device (e.g., a network device or a mobile terminal) adapted for employing an embodiment of the invention by further configuration of the processor 94 by instructions for performing the algorithms and operations described herein. The processor 94 may include, among other things, a clock, an arithmetic logic unit (ALU) and logic gates configured to support operation of the processor 94.

In an example embodiment, the processor 94 may be embodied as, include or otherwise control the DIP controller 97. The DIP controller 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the DIP controller 97, as described below. Thus, in an example in which software is employed, a device or circuitry (e.g., the processor 94 in one example) executing the software forms the structure associated with such means.

The DIP controller 97 of the network device 90 of a cloud system may transmit or receive one or more DIP documents from one or more communication devices (e.g., apparatuses 50) of users/consumers of the cloud system. The DIP controller 97 may utilize the DIP document(s), in part, to exchange or provide requested data regarding the DIP document(s) to one or more communication devices (e.g., apparatuses 50) requesting data (e.g., one or more instances of data) of the DIP document(s), as described more fully below. In this regard, the DIP controller 97 is configured to transmit and/or receive a DIP document(s) that one or more communication devices provide (e.g., by utilizing a Put rest API) to the network device 90 of the cloud system and may provide data of a DIP document(s) to one or more communication devices (e.g., apparatuses 50) that desires to receive (e.g., by utilizing a Get rest API) the data or a portion of the data of the DIP document(s) from the network device 90.

For purposes of illustration and not of limitation, a DIP document may include data about a person such as, for example, John Doe, a fictitious person. In this regard, the DIP document may include one or more properties about the person such as for example, the person's name (e.g., John Doe), employer (e.g., ABC Corporation, a fictitious corporation), specialty or title (e.g., programmer), age (e.g., 30 years old), etc. These properties may be in a structured syntax (e.g., a JSON syntax) of the DIP document. The DIP controller 97 may create a DIP document(s) and may send the created DIP document(s) to one or more communication devices (e.g., apparatuses 50). In addition, the DIP controller 97 may receive a DIP document from a communication device (e.g., an apparatus 50). In this regard, in an instance in which one or more communication devices (e.g., another apparatus 50) send a request to the network device 90 of the cloud system for one or more items of data (also referred to herein as instances of data) of the DIP document, the DIP controller 97 may analyze the DIP and provide the communication device the requested items of data.

In an example embodiment, the DIP controller 97 may analyze instances of a data model (e.g., a DIP data model) to determine whether one or more properties of a DIP document(s) are valid for usage in the DIP document(s). For instance, the data model may define or specify each of the properties that are allowed for a particular type. For example, each of the objects of the DIP document(s) may be assigned a name and type which may denote that the instances are of the type specified and may be utilized in part to interpret the data, as described more fully below.

The DIP controller 97 may also analyze and/or parse instances of data of DIP objects of a DIP document and validate that the instances of data are valid. For example, in an instance in which the DIP controller 97 analyzes a DIP object that does not have a _type set to a valid type in a system (e.g., cloud system) the DIP controller 97 may generate an exception or error message. The exception/error message denotes that the DIP object(s) is invalid.

The DIP controller 97 may define many properties associated with the type Field. When the DIP controller 97 defines property P of type X, these properties may be utilized to specify or define the data type of property P, and other restrictions associated with property P. These defined properties may be part of a data interchange modeling language. In this regard, the DIP controller 97 may determine whether instances of data of DIP documents conform to the definitions (e.g., property definitions, property restrictions, etc.) of the data modeling language. The properties defined by the DIP controller 97 that are associated with a type Field may include, but are not limited to, dataType, sequence, isFieldOf, restriction, maxLength, minLength, maxItems, minItems, minimum, maximum, propertyDisjointWith, propertyIntersectWith, default, enum, minCardinality, maxCardinality and any other suitable defined properties. These defined properties are described more fully below.

Referring now to FIG. 7A, an instance of type Field is provided according to an example embodiment. The full/entire definition of type Field is shown in FIGS. 7A, 7B, 7C, 7D, 7H, 7I, 7J, 7L, 7M, 7N, 7O, 7P, 7Q, 7S, 7R, 7T, 7U, 7V into a single DIP document.

FIG. 7B shows a definition of dataType property as defined by the DIP controller 97. In the example embodiment of FIG. 7B, the dataType is a property of Field, its dataType is any, which denotes that it may hold any value type, a list of that value type, or a DIP object(s). The value of dataType may be any of the values supported by JSON such as, for example, string, number, null, true, false, etc. The value of dataType may also be an object including system property _ref. In this regard, the property being defined, by the DIP collector 97, is an object property whose value is an instance of the type specified as the value of _ref, as shown in FIG. 7C. The DIP controller 97 may utilize the dataType property definition to analyze data of a DIP document(s) to determine whether the dataType of the DIP document(s) adheres to the rules of the dataType property definition. In an instance in which the DIP controller 97 determines that an instance of data of a DIP document(s) does not meet the dataType property definition, the DIP controller 97 may generate an indication of an exception or error (e.g., an exception message or an error message).

Referring now to FIG. 7C, an example embodiment of an alternate dataType property definition is shown. For example, FIG. 7C illustrates an alternative definition of the value of dataType property as a DIP object. As shown in FIG. 7C, the value of _ref is Entry. In this regard, the property being defined by the DIP collector 97, in this example dataType, is an object property pointing to any instance of Entry.

Referring now to FIG. 7D, a diagram illustrating a restriction property definition is provided according to an example embodiment. In some instances, even though the type of the property value defined by the DIP controller 97 is a string, the string may represent a URI. As such, in order to state that the string represents a URI in the data model, the DIP controller 97, may utilize the restriction property (e.g., "_name": restriction") defined in Field, as shown in the definition of restriction property in FIG. 7D. For instance, in the example embodiment of FIG. 7D, restriction is a property of type Field. The DIP controller 97 may utilize the restriction property definition of the data model to determine whether restrictions of properties of DIP documents (e.g., DIP documents received from a communication device (e.g., apparatus 50)) are valid, as described more fully below.

Referring now to FIG. 7E, a diagram illustrating usage of the restriction property is provided according to an example embodiment. The example embodiment of FIG. 7E illustrates a DIP object with a defined property called Indexed- Properties. This property is a property of type SCBEIndex. In the DIP object of FIG. 7E isFieldOf indicates SCBEIndex which denotes that the value of IndexedProperties is an object of type Field that is expressed as a string. As such, in an instance in which the DIP controller 97 receives a DIP document, for example from a communication device (e.g., apparatus 50), having an instance of SCBEIndex in which SCBEIndex has a value as an integer (e.g., a number) as the property of IndexedProperties, the DIP controller 97 may generate an indication of an exception or an error since the integer is not a string. In an instance in which SCBEIndex has a value as string as the property of IndexedProperties, but that string is not an instance of type Field, the DIP controller 97 may generate an indication of an exception (e.g., an exception message or error message).

As described above, in the example embodiment of FIG. 7E, the property indexedProperties of SCBEIndex has its value as string. However, this value is a relative URI to an instance of type Field, as specified in restriction in FIG. 7E. The DIP controller 97 enforcing DIP rules may enforce a rule that an instance of SCBEIndex including the property indexedProperties has its value as an instance of Field.

Referring now to FIG. 7F, a diagram illustrating a DIP document including an instance of SCBEIndex is provided according to an example embodiment. FIG. 7F shows a valid DIP document including an instance of SCBEIndex. That is, a DIP controller 97 enforcing a rule that an instance of SCBEIndex includes the property indexedProperties has its value as a string and an instance of Field, determines the instance in the DIP document of FIG. 7F is valid. The DIP controller 97 determines that the DIP document of FIG. 7F is valid because the value of indexedProperties placesId is an instance of type Field in the DIP document.

Referring now to FIG. 7G, a DIP document containing an invalid instance of SCBEIndex is provided according to an example embodiment. The SCBEIndex in FIG. 7G is invalid because the DIP controller 97 analyzes the instance of data of the DIP object and determines that the value of indexedProperties is ppId which is not an instance of Field. Instead, the instance of Field in this example should be placesId.

Referring now to FIG. 7H, a diagram illustrating a definition of minimum cardinality is provided according to an example embodiment. The minimum cardinality is a property of type Field and data type number. More particularly, the minimum cardinality (also referred to herein as minCardinality) property is of type Field and is defined by the DIP controller 97 to specify the minimum number of occurrences of the property being defined in an instance. For example, setting minCardinality to 1 specifies that a property is required in an instance of a DIP document(s). As another example, setting minCardinality to 0 specifies that a property is optional in an instance of a DIP document(s). When minCardinality is not present in an instance of a DIP document(s), the DIP controller 97 may determine that the value of minCardinality is zero.

Referring back to FIG. 7E, FIG. 7E shows that indexProperties is required in any instance, for that instance to be valid. In an instance in which minCardinality has its value equal to n, a valid instance must then contain a minimum of n occurrence of this property. In this regard, the DIP modeling language is capable of representing properties with a higher cardinality than one, due to the manner in which DIP objects are serialized in the JSON syntax. This is unlike JSON object serialization which is typically only able to represent properties with a cardinality of one. For more information on the data interchange protocol representing properties with a higher cardinality than one, see U.S. patent application Ser. No. 13/924,183, entitled: Methods, Apparatuses and Computer Program Products for Facilitating a Data Interchange Protocol, which is filed concurrently herewith. The content of the foregoing patent application is hereby incorporated by reference in its entirety.

As an example, consider an instance in which the DIP controller 97 defines a minimum cardinality for a property such as an address to be 2. In this example, the DIP controller 97 may analyze DIP documents and determine that a DIP document with two or more addresses (e.g., a home address and a work address) is valid. On the other hand, in an instance in which the DIP controller 97 determines that a DIP document only has one address (e.g., a home address), the DIP controller 97 may determine that the minimum cardinality and thus the DIP document is invalid because the DIP document did not include the minimum of two addresses. In this regard, the DIP controller 97 may generate an indication of an exception or error (e.g., an exception or error message). In an example embodiment, the DIP controller 97 may send indications of an exception(s) or error(s) to an originating communication device (e.g., apparatus 50) of the DIP document to notify the originating communication device of the exception/error.

Referring now to FIG. 7I, a diagram illustrating a definition of maximum cardinality is provided according to an example embodiment. The maximum cardinality (also referred to herein as maxCardinality) property is of type Field is defined by the DIP controller 97 to specify the maximum occurrence of the property being defined in an instance. In an instance in which maxCardinality is set to m for a property P of type X, an instance of X of a DIP document may at most include m occurrences of P. Referring back to FIG. 7E, FIG. 7E shows that indexProperties may occur only once in any instance. As such, in the example embodiment of FIG. 7E, in an instance in which the DIP controller 97 determines that an instance of a data of a DIP document includes multiple occurrences of indexProperties, the DIP controller 97 may determine that the instance is invalid.

As another example, consider an instance in which the minimum cardinality is defined as 2 and maximum cardinality is defined as 2 for a property of addresses. In this regard, in an instance in which the DIP controller 97 analyzes a DIP document and determines that the DIP document includes one address, the DIP controller 97 may determine that the DIP document is invalid. Similarly, in an instance in which the DIP controller 97 determines that a DIP document has three addresses, the DIP controller 97 may determine that the DIP document is invalid. In this example embodiment, the DIP document(s) being analyzed by the DIP controller 97 should have two addresses to be valid since the minimum cardinality is 2 and the maximum cardinality is 2.

As another example, consider an instance in which the DIP controller 97 defines the minimum cardinality as 2 and the maximum cardinality as 4 for an address property. In this regard, the DIP controller 97 may determine that 2, 3 or 4 addresses in a DIP document(s) are valid. However, the DIP controller 97 may determine that a DIP document(s) having 5 or more addresses or only one address is invalid in this example.

Referring now to FIG. 7J, a diagram illustrating a definition of enum is provided according to an example embodiment. In an instance in which the DIP controller 97 defining property P of type X, the DIP controller 97 may utilize the property enum of type Field to limit the value space of property P. In this regard, in an instance in which the DIP controller 97 defines a property, the DIP controller 97 has the option of choosing an enum attribute to specify whether the value of the property needs to be limited to certain values.

For example, the DIP controller 97 may specify a value for enum. In some instances, the DIP controller 97 may specify that a value of a property such, for example, gender is a string and in this regard the value of gender may be either male or female. In this regard, the manner in which to specify the value of the property gender in this example is to utilize enum. As such, in this example embodiment, the DIP controller 97 may define the property that is of type Field and utilize the enum attribute set, in this example, to specify male and female.

Referring now to FIG. 7K, a diagram illustrating an example usage of enum is provided according to an example embodiment. FIG. 7K shows the definition of a property referred to as system of record (sor) of type systemProperties. As shown in FIG. 7K, sor is a property because the type is Field. The dataType of sor is a string. In this example embodiment, the DIP controller 97 may specify enum to indicate that the value of sor is always either "scbe" or "analytics". Therefore, in an instance in which the DIP controller 97 determines that an instance of type systemProperties of a DIP document has the property sor set to any value other than "scbe" or "analytics" the DIP controller 97 may determine that the corresponding instance of data and/or the corresponding DIP document is invalid, which may trigger the DIP controller 97 to generate an indication of an exception or an error (e.g., an exception message or an error message).

Referring now to FIG. 7L, a diagram illustrating a definition of default is provided according to an example embodiment. In an instance in which the DIP controller 97 defines property P of type X, the property default of type Field informs the DIP controller 97 to add property P with its value set to the value of default to any instance of type X not containing property P. In other words, the default value denotes that in an instance in which a property on a type is being defined and a default value is specified, the DIP controller 97 may add the default value as the value of that property for an instance document (e.g., a DIP document) that does not have value assigned to the property.

As shown in FIG. 7K in an instance in which both default and enum are specified, the value of default must be specified as one of the values of enum. In the example embodiment of FIG. 7K, the value of default is "scbe". As such, for any instance of type systemProperties that does not have the sor property in a DIP object of a DIP document, the DIP controller 97 may add the sor property and assign the sor property the value "scbe" in the DIP document since the default value is "scbe".

Referring now to FIG. 7M, a diagram illustrating a definition of isFieldOf is provided according to an example embodiment. In the example embodiment of FIG. 7M, isFieldOf specifies the type that a property belongs to. As shown in FIG. 7M, the type is Field and "isFieldOf" is Field which means that the property field "isFieldOf" is a member property of the type Field.

Referring now to FIG. 7N, a diagram illustrating a propertyIntersectWith definition is provided according to an example embodiment. In an instance in which the DIP controller 97 defines a property P of type X, the DIP controller 97 may utilize {"propertyIntersectWith": ["Q"] } to indicate that property P may only be used in conjunction with property Q. Therefore, an instance of data of type X includes property P in a DIP document, but not containing property Q may trigger the DIP controller 97 to generate an indication of an exception or error (e.g., an exception message or exception error).

As another example, consider an instance in which a DIP controller 97 specifies a type having property a and property b. For instance, the DIP controller 97 may utilize propertyintersectsWith to specify that the property has a and property b. In other words, property a intersects with property b. In this regard, the DIP controller 97 utilizes propertyintersectsWith such that when property a is included in an instance of data in a DIP document then property b must also be included in the instance of data in the DIP document. The value of propertyintersectsWith is another property that occurs in an instance of data (e.g., a DIP object) of a DIP document.

Referring now to FIG. 7O, a diagram illustrating a propertyDisjointWith definition is provided according to an example embodiment. In the example embodiment of FIG. 7O, the DIP controller 97 may define property P of type X, and utilize {"propertyDisjointWith": ["Q"] } to indicate that property P must not be used in conjunction with property Q. Therefore, an instance of type X containing property P, and containing property Q may trigger the DIP controller 97 to generate an indication of an exception or an error.

Referring now to FIG. 7P, a definition of minimum is provided according to an example embodiment. In the example embodiment of FIG. 7P, the DIP controller 97 may define property P of type X, and {"minimum": n} in which n is some number, which is utilized to indicate that an instance of X containing property P with a value less than n triggers the DIP controller 97 to generate an indication of an exception or error.

As an example in which the DIP controller 97 defines a property and the property has an attribute such as minimum, consider an example in which a property age is specified with a minimum age of 18. As such, in an instance in which the DIP controller 97 analyzes a DIP document with an age that is less than 18 (e.g., 16), the DIP controller 97 may generate an indication of an exception or an error.

Referring now to FIG. 7Q, a definition of maximum is provided according to an example embodiment. In the example embodiment of FIG. 7Q, the DIP controller 97 may define property P of type X, and {"maximum": n}, in which n is some number that is utilized to indicate that an instance of X containing property P with a value greater than n triggers the DIP controller 97 to generate an indication of an exception or an error (e.g., an exception message, an error message).

As an example in which the DIP controller 97 defines a property and the property has an attribute such as maximum, consider an example in which a property age is specified with a maximum age of 90. As such, in an instance in which the DIP controller 97 analyzes a DIP document with an age that is higher than 90 (e.g., 95), the DIP controller 97 may generate an indication of an exception or an error.

In an example embodiment, minimum attributes and maximum attributes are attributes on a property such as, for example, a property on a value like an integer (e.g., a restriction associated with the value).

Referring now to FIG. 7R, a diagram illustrating a minimum length definition is provided according to an example embodiment. In the example embodiment of FIG. 7R, the DIP controller 97 may define the minimum length (also referred to herein as minLength). In addition, in the example embodiment of FIG. 7R, the DIP controller 97 may utilize the minLength definition and define property P of type X, and {"minLength": n}, which may be utilized to indicate that an instance of X includes a property P having a value with its length less than n triggers the DIP controller 97 generate an indication of an exception or error (e.g., an exception message or an error message). In an example embodiment, the definition of minLength is utilized by the DIP controller 97 with properties whose types are string.

For purposes of illustration and not of limitation, as an example, the DIP controller 97 may define the minLength for an address property to restrict the address to 100 characters long. As such, in an instance in which the DIP controller 97 analyzes a DIP document and detects an address with less than 100 characters, the DIP controller 97 may generate an indication of an exception or error.

Referring now to FIG. 7S, a diagram illustrating a maximum length definition is provided according to an example embodiment. In the example embodiment of FIG. 7S, the DIP controller 97 may define the maximum length (also referred to herein as maxLength). Additionally, in the example embodiment of FIG. 7S, the DIP controller 97 may utilize the maxLength definition and define property P of type X, and {"maxLength": n}, which is utilized to indicate that an instance of X containing property P having a value with its length greater than n triggers the DIP controller 97 to generate an indication of an exception or error (e.g., an exception message or error message). In an example embodiment, the definition of maxLength is utilized with properties whose types are string.

For purposes of illustration and not of limitation, as an example, the DIP controller 97 may define the maxLength for an address property to restrict the address to 500 characters long. As such, in an instance in which the DIP controller 97 analyzes a DIP document and detects an address with more than 500 characters, the DIP controller 97 may generate an indication of an exception or error.

Referring now to FIG. 7T, a diagram illustrating a minimum items definition is provided according to an example embodiment. In the example embodiment of FIG. 7T, the DIP controller 97 may define the minimum items (also referred to herein as minItems). In the example embodiment of FIG. 7T, the DIP controller 97 may utilize the minItems definition and may define property P of type X, and {"minItems": n}, which is utilized to indicate that an instance of X containing property P having a value of type list with its size less than n triggers the DIP controller 97 to generate an indication of an exception or an error. In an example embodiment, the definition of minItems is utilized with properties whose types are list. For example, a minimum list of items (e.g., the list includes a minimum of three items).

Referring now to FIG. 7U, a diagram illustrating a maximum items definition is provided according to an example embodiment. In the example embodiment of FIG. 7U, the DIP controller 97 may define the maximum items (also referred to herein as maxItems). In the example embodiment of FIG. 7U, the DIP controller 97 may define property P of type X, and {"maxItems": n}, in which n is a number utilized to indicate that an instance of X containing property P having a value of type list with its size greater than n triggers the DIP controller 97 to generate an indication of an exception or error. In an example embodiment, the definition of maxItems is utilized with properties whose types are list. For instance, a maximum list of items (e.g., the list includes a maximum of five items).

Referring now to FIG. 7V, a diagram illustrating a sequence definition according to an example embodiment is provided. The sequence is used to associate a monotonic number with each property definition. In an example embodiment, the sequence definition may be an optional property of type Field. In this regard, for purposes of illustration and not of limitation, in an instance in which the DIP controller 97 defines five properties in a DIP document, the DIP controller 97 may assign sequence 1 to the first property, sequence 2 to the second property, sequence 3 to the third property, sequence 4 to the fourth property and sequence 5 to the fifth property.

In addition to specifying cardinality constraints on properties, the DIP controller 97 may define the data interchange protocol to permit the specifying of cardinality and disjointness restrictions on objects. This functionality of the DIP controller 97 may permit a user to specify that an instance of some type X, may occur zero, exactly once, at most n, or at a minimum n times in a DIP document(s). The DIP controller 97 may define disjointness restrictions on an object(s) (e.g., a DIP object(s)) specifying that an instance named instance_name cannot be of type X, and of type Y simultaneously.

Referring now to FIG. 8, a diagram illustrating the definition of object is provided according to an example embodiment. As shown in FIG. 8, the object type is Entry with the name "Object" and includes a comment about the object. The definition of object in the example embodiment of FIG. 8 also includes an identifier (e.g., "_id") to the key/value store (e.g., a key/value store of a network device (e.g., network device 90)) of the object in a DIP document.

Referring now to FIG. 9A, a diagram illustrating a definition of minimum cardinality is provided according to an example embodiment. The minimum cardinality (also referred to herein as minCardinality) definition of FIG. 9A is a Field associated with type Object. In an instance in which an instance X of type Object, contains property minCardinality=n, n is some number. As such, the property minCardinality=n specifies that the DIP document(s) being processed by the DIP controller 97 must include a minimum of n instances of type X. The DIP document(s) being processed by the DIP controller 97 may be received from one or more communication devices (e.g., one or more apparatuses 50).

Referring now to FIG. 9B, a diagram illustrating a definition of maximum cardinality is provided according to an example embodiment. The maximum cardinality (also referred to herein as maxCardinality) definition is a Field associated with type Object. In an instance in which instance X of type Object includes property maxCardinality=n, n is some number. As such, the property maxCardinality=n specifies that a DIP document(s) being processed by the DIP controller 97 includes at most n instances of type X. The DIP document(s) being processed by the DIP controller 97 may be received from one or more communication devices (e.g., one or more apparatuses 50).

Referring now to FIG. 9C, a diagram illustrating a disjointWith definition is provided according to an example embodiment. In the example embodiment of FIG. 9C, disjointWith is a Field associated with type Object. In an instance in which an instance X of type Object includes property disjointWith=["Y"], Y is some object defined in a system (e.g., a cloud system) by the DIP controller 97. In this regard, the property disjointWith specifies that a DIP document(s) being processed by the DIP controller 97 should not include any object instance of type X, and of object instance type Y. In other words, the DIP document that includes the object instance of type X object should not also include the object instance of type Y in the DIP document. In an instance in which the DIP controller 97 determines that the DIP document includes the object instance of type X and the object instance of type Y, the DIP controller 97 may generate an indication of an exception or error.

Referring now to FIG. 9D, a diagram illustrating an intersectWith definition is provided according to an example embodiment. In the example embodiment of FIG. 9D, intersectWith is a Field associated with type Object. In an instance in which an instance X of type Object includes property intersectWith=["Y"], Y is an object defined in a system (e.g., a cloud system) by the DIP controller 97. In this regard, the property intersectWith specifies that a DIP document(s) being processed by the DIP controller 97 should not include any object instance of type X, which is not also of object instance of type Y. In other words, the DIP document should include the object instance of type X as well as the object instance of type Y in the DIP document. In the example embodiment of FIG. 9D, in an instance in which the DIP controller 97 determines that the DIP document includes the object instance of type X but does not include the object instance of type Y, the DIP controller 97 may generate an indication of an exception or error.

Referring now to FIG. 9E, a diagram illustrating an example of use of type Object is provided according to an example embodiment. The DIP object of a DIP document 7 of FIG. 9E includes the property index (e.g., SCBEIndex) and the intersectWith Field specifying that the index should intersect with an access control to the index (e.g., scbeAccessControl). As such, for example, in an instance in which a DIP document (e.g. a Social Platform schema) is being evaluated by the DIP controller 97, the DIP controller 97 may determine that the DIP document is valid in an instance in which the DIP controller detects an index (e.g., SCBEIndex) and a specified access control to the index (e.g., scbeAccessControl) in the DIP document.

In an example embodiment, the DIP controller 97 may define DIP to support a mechanism to express Is-A relationships between objects. In this regard, for example, the DIP controller 97 may process object A to extend object B in the following manner.

The DIP controller 97 may copy all objects of type Field in DIP document B to a new DIP document C. In addition, the DIP controller 97 may copy all objects of type Field in DIP document A to a new DIP document C.

The DIP controller 97 may process DIP document C in an in instance in which DIP document A includes an instance of type Field with the same name as an instance of type Field in document B. In this regard, the DIP controller 97 may ensure that the constraints defined in both documents A and B are enforced in an instance in which the property is defined as required in DIP document B. Otherwise, the DIP controller 97 may determine that the property defined in DIP document A overrides the field defined in document B.

Additionally, the DIP controller 97 may copy all objects of type Object in DIP document B to the new DIP document C. The DIP controller 97 may also copy all objects of type Object in DIP document A to the new DIP document C. The definition of extends is provided in FIG. 3.

Referring now to FIG. 10, a diagram illustrating an example use of extends is provided according to an example embodiment of the invention. The example embodiment of FIG. 10 shows the manner in which the SCBEModelTest2 DIP document extends the "scbeAccessControl" DIP document, the "systemProperties" DIP document, the "DiscoveryMetadata" DIP document and the "scbeAttachment" DIP document. In other words, the SCBEModelTest2 DIP document is extending the "scbeAccessControl" DIP document, the "systemProperties" DIP document, the "DiscoveryMetadata" DIP document and the "scbeAttachment" DIP document.

Referring now to FIG. 11, a diagram illustrating usage of a DIP modeling language to validate data models is provided according to an example embodiment. In the example embodiment of FIG. 11, the DIP controller 97 may validate one or more data models. In FIG. 11, application 1 instance data and application n instance data denote application instance data. The DIP controller 97 may utilize application 1 data model and application n data model to validate application 1 instance data and application n instance data respectively.

In the example embodiment of FIG. 11, application 1 data model and application n data model may utilize the DIP modeling language defined by the DIP controller 97 whereas application 1 instance data and application 2 instance data utilize the data interchange protocol. In the example embodiment of FIG. 11, the application 1 data model and the application n data model is validated, via the DIP controller 97, by a platform data model such as, for example, a social platform meta-model. The platform data model (e.g., social platform meta-model (e.g., a schema)) utilizes the DIP modeling language defined by the DIP controller 97.

In this manner, the DIP controller 97 may implement the platform data model (e.g., social platform meta-model) to validate applications data model(s) at runtime in order to ensure that the data quality meets an expected standard. The platform data model (e.g., social platform meta-model) may include properties (e.g., a collection of properties) and a created meta-model that is used to validate social platforms data models, in this example.

In the example embodiment of FIG. 11, in an instance in which an application data model (e.g., application 1 data model, application 2 data model) is validated, the application data model may be utilized by the DIP controller 97 to validate instance data (e.g., instance data of application 1, instance data of application n) of a corresponding application(s) (e.g., application 1, application n).

Referring now to FIG. 12, a flowchart of an example method for defining a data interchange protocol modeling language is provided. At operation 1200, an apparatus (e.g., network device 90) may define a data interchange protocol modeling language specifying a data model(s) shared by one or more communication devices (e.g., apparatuses 50). The data model(s) may include data specifying criteria to define one or more data interchange protocol objects including instances of data. At operation 1205, an apparatus (e.g., network device 90) may specify features in the data model(s) corresponding to properties or the data interchange protocol objects. The specified features may be utilized in part to determine whether one or more properties or objects of at least one data interchange protocol document are valid.

In an example embodiment, the specified features may include, but are not limited to, a dataType property definition, a restriction property definition, an enum property definition, a default property definition, an isFieldOf property definition, a minCardinality property definition, a maxCardinality property definition, a propertyIntersectWith definition, a propertyDisjointWith definition, a minimum property definition, a maximum property definition, a minLenth property definition, a maxLength property definition, a minItems property definition, a maxItems property definition, a sequence property definition, a minCardinality object definition, a maxCardinality object definition, a disjointWith object definition, an intersectWith property definition, a DIP object extension feature and any other suitable features.

At operation 1210, an apparatus (e.g., network device 90) may evaluate at least one object of a data interchange protocol document to determine whether the object is valid based in part on analyzing defined items of data in the data model(s) specifying that objects assigned a type and a name are valid objects.

It should be pointed out that FIG. 12 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, DIP managing module 78, processor 94, DIP controller 97). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the methods of FIG. 12 above may comprise a processor (e.g., the processor 70, the DIP managing module 78, the processor 94, the DIP controller 97) configured to perform some or each of the operations (1200-1210) described above. The processor may, for example, be configured to perform the operations (1200-1210) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1200-1210) may comprise, for example, the processor 70 (e.g., as means for performing any of the operations described above), the DIP managing module 78, the processor 94, the DIP controller 97 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
defining, via a processor, a data interchange protocol modeling language specifying data models shared by one or more communication devices, the data models comprise data specifying criteria to define one or more data interchange protocol objects comprising instances of data;
specifying features in the data models corresponding to (i) properties of the objects or (ii) the objects and defining a property restriction in the data models to designate a restriction for at least one property of the data interchange protocol document, the specified features and the defined property restriction being utilized in part to determine whether one or more properties or objects of at least one data interchange protocol document are valid, wherein the defined property restriction restricts a value of a property type for the at least one property of the data interchange protocol document; and
evaluating at least one object of a data interchange protocol document to determine whether the object is valid based in part on analyzing defined items of data in the data models specifying that objects assigned a type and a name are valid objects.

2. The method of claim 1, wherein, a syntax of the data interchange protocol modeling language comprises a JavaScript Object Notation syntax.

3. The method of claim 2, further comprising:
generating an indication of an error in an instance in which the determination indicates that the object is not assigned a type and name, the error denotes that the data interchange protocol document is invalid, and
wherein the data interchange protocol document is received from one of the communication devices.

4. The method of claim 1, further comprising:
determining whether the at least one property includes the designated restriction to detect whether the property is valid.

5. The method of claim 2, wherein specifying features further comprises:
defining a minimum cardinality in the data models specifying a minimum number of occurrences of at least one property that are required in the data interchange protocol document.

6. The method of claim 5, further comprising:
analyzing the data interchange protocol document to determine whether the data interchange protocol document includes the minimum number of occurrences of the at least one property.

7. The method of claim 2, wherein specifying features further comprises:
defining a maximum cardinality in the data object model specifying a maximum number of occurrences of at least one property that are required in the data interchange protocol document.

8. The method of claim 7, further comprising:
analyzing the data interchange protocol document to determine whether the data interchange protocol document includes the maximum number of occurrences of the at least one property.

9. The method of claim 2, wherein specifying features further comprises:
designating a property of an instance of a data interchange protocol object to intersect with another property of the instance of the data interchange protocol object in the data models to indicate that at least one property of the data interchange protocol document is required to be utilized in conjunction with the another property of the data interchange protocol document.

10. The method of claim 2, wherein specifying features further comprises:
designating a property of an instance of a data interchange protocol object as disjointed with another property in the data models to indicate that at least one property of the data interchange protocol document is unusable in conjunction with the another property of the data interchange protocol document.

11. An apparatus comprising:
at least one processor; and
at least one memory including computer program code configured to, with the at least one processor, cause the apparatus to perform at least the following:
define a data interchange protocol modeling language specifying data models shared by one or more communication devices, the data models comprise data specifying criteria to define one or more data interchange protocol objects comprising instances of data;
specify features in the data models corresponding to (i) properties of the data interchange protocol objects or (ii) the data interchange protocol objects and define a property restriction in the data models to designate a restriction for at least one property of the data interchange protocol document, the specified features and the defined property restriction being utilized in part to determine whether one or more properties or objects of at least one data interchange protocol document are valid, wherein the defined property restriction restricts a value of a property type for the at least one property of the data interchange protocol document; and
evaluate at least one object of a data interchange protocol document to determine whether the object is valid based in part on analyzing defined items of data in the data models specifying that objects assigned a type and a name are valid objects.

12. The apparatus of claim 11, wherein a syntax of the data interchange protocol modeling language comprises a JavaScript Object Notation syntax.

13. The apparatus of claim 12, wherein the memory and computer program code are configured to, with the processor, cause the apparatus to:
generate an indication of an error in an instance in which the determination indicates that the object is not assigned a type and name, the error denotes that the data interchange protocol document is invalid, and
wherein the data interchange protocol document is received from one of the communication devices.

14. The apparatus of claim 11, wherein the memory and computer program code are configured to, with the processor, cause the apparatus to:
determine whether the at least one property includes the designated restriction to detect whether the property is valid.

15. The apparatus of claim 12, wherein the memory and computer program code are configured to, with the processor, cause the apparatus to:
specify the features by defining a minimum cardinality in the data models specifying a minimum number of occurrences of at least one property that are required in the data interchange protocol document.

16. The apparatus of claim 15, wherein the memory and computer program code are configured to, with the processor, cause the apparatus to:
analyze the data interchange protocol document to determine whether the data interchange protocol document includes the minimum number of occurrences of the at least one property.

17. The apparatus of claim 12, wherein the memory and computer program code are configured to, with the processor, cause the apparatus to:
specify the features by defining a maximum cardinality in the data models specifying a maximum number of occurrences of at least one property that are required in the data interchange protocol document.

18. The apparatus of claim 17, wherein the memory and computer program code are configured to, with the processor, cause the apparatus to:
analyze the data interchange protocol document to determine whether the data interchange protocol document includes the maximum number of occurrences of the at least one property.

19. The apparatus of claim 12, wherein the memory and computer program code are configured to, with the processor, cause the apparatus to:
specify the features by designating a property of an instance of a data interchange protocol object to intersect with another property of the instance of the data interchange protocol object in the data models to indicate that at least one property of the data interchange protocol document is required to be utilized in conjunction with the another property of the data interchange protocol document.

20. The apparatus of claim 12, wherein the memory and computer program code are configured to, with the processor, cause the apparatus to:
specify the features by designating a property of an instance of a data interchange protocol object as disjointed with another property in the data models to indicate that at least one property of the data interchange protocol document is unusable in conjunction with the another property of the data interchange document.

* * * * *

UNITED STATES PATENT AND TRADEMARK OFFICE
CERTIFICATE OF CORRECTION

PATENT NO. : 9,454,348 B2
APPLICATION NO. : 13/924227
DATED : September 27, 2016
INVENTOR(S) : Sabbouh It is certified that error appears in the above-identified patent and that said Letters Patent is hereby corrected as shown below:

In the Claims

Column 26
Line 63, Claim 20 "with the another property of the data interchange" should read --with the another property of the data interchange protocol--

Signed and Sealed this
Twenty-second Day of May, 2018

Andrei Iancu
*Director of the United States Patent and Trademark Office*